(12) United States Patent
Sato

(10) Patent No.: US 10,885,616 B2
(45) Date of Patent: Jan. 5, 2021

(54) IMAGE PROCESSING APPARATUS, IMAGE PROCESSING METHOD, AND RECORDING MEDIUM

(71) Applicant: CASIO COMPUTER CO., LTD., Tokyo (JP)

(72) Inventor: Takeshi Sato, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 133 days.

(21) Appl. No.: 16/153,133

(22) Filed: Oct. 5, 2018

(65) Prior Publication Data

US 2019/0108628 A1    Apr. 11, 2019

(30) Foreign Application Priority Data

Oct. 5, 2017 (JP) ................................. 2017-195425

(51) Int. Cl.
*G06T 5/50*    (2006.01)
*G06T 11/00*    (2006.01)
(Continued)

(52) U.S. Cl.
CPC ............... *G06T 5/50* (2013.01); *G06T 5/009* (2013.01); *G06T 5/40* (2013.01); *G06T 11/001* (2013.01); *G06T 11/60* (2013.01); *H04N 5/23219* (2013.01); *G06K 9/00248* (2013.01); *G06T 5/002* (2013.01); *G06T 7/73* (2017.01); *G06T 2207/10024* (2013.01); *G06T 2207/20028* (2013.01); *G06T 2207/20221* (2013.01); *G06T 2207/30201* (2013.01);
(Continued)

(58) Field of Classification Search
CPC . G06T 5/50; G06T 5/009; G06T 11/60; G06T 11/001; G06T 5/40; H04N 5/23219
USPC .................................................. 382/162, 167
See application file for complete search history.

(56) References Cited

U.S. PATENT DOCUMENTS 6,035,074 A    3/2000 Fujimoto et al.
6,845,181 B2    1/2005 Dupin et al.
(Continued)

FOREIGN PATENT DOCUMENTS

CN    105956576 A    9/2016
JP    2007193729 A    8/2007
JP    2009065269 A    3/2009

OTHER PUBLICATIONS

Chinese Office Action (and English language translation thereof) dated Apr. 20, 2020 issued in related Chinese Application No. 201811165902.5.
(Continued)

*Primary Examiner* — Ayodeji O Ayotunde
(74) *Attorney, Agent, or Firm* — Holtz, Holtz & Volek PC

(57) ABSTRACT

An imaging apparatus 1 includes an image acquisition unit 51, an image processing unit 53, a mask image creation processing unit 54, and a processed image creation processing unit 55. The image acquisition unit 51 acquires a face image. The image processing unit 53 adjusts the brightness of the face image acquired by the image acquisition unit 51. The image processing unit 53 combines the face image acquired by the image acquisition unit 51 with the processed face image, using map data in which a predetermined region of a face is set as a transparent region on the basis of the reflection state of light emitted to the face.

15 Claims, 13 Drawing Sheets

(51) Int. Cl.
  G06T 5/40 (2006.01)
  G06T 5/00 (2006.01)
  G06T 11/60 (2006.01)
  H04N 5/232 (2006.01)
  H04N 9/64 (2006.01)
  H04N 5/235 (2006.01)
  G06T 7/73 (2017.01)
  G06K 9/00 (2006.01)
  H04N 9/77 (2006.01)
  H04N 5/225 (2006.01)

(52) U.S. Cl.
  CPC ...... *G06T 2210/22* (2013.01); *G06T 2210/62* (2013.01); *H04N 5/2256* (2013.01); *H04N 5/2354* (2013.01); *H04N 9/643* (2013.01); *H04N 9/646* (2013.01); *H04N 9/77* (2013.01)

(56) References Cited

U.S. PATENT DOCUMENTS

| | | | |
|---|---|---|---|
| 7,269,292 | B2 | 9/2007 | Steinberg |
| 7,634,106 | B2 | 12/2009 | Mino et al. |
| 7,940,964 | B2 | 5/2011 | Kobayashi |
| 2005/0168596 | A1 | 8/2005 | Ito et al. |
| 2007/0183658 | A1* | 8/2007 | Kobayashi ......... G06K 9/00228 382/162 |
| 2007/0188816 | A1 | 8/2007 | Hayaishi |
| 2008/0317339 | A1* | 12/2008 | Steinberg ............. G06K 9/0061 382/167 |
| 2009/0231467 | A1 | 9/2009 | Yamashita et al. |
| 2010/0054592 | A1 | 3/2010 | Nanu et al. |
| 2010/0061631 | A1 | 3/2010 | Omori |
| 2010/0111408 | A1 | 5/2010 | Matsuhira et al. |
| 2012/0177288 | A1 | 7/2012 | Chaussat et al. |
| 2012/0300990 | A1* | 11/2012 | Hanna ................ G06K 9/00604 382/117 |
| 2015/0091900 | A1* | 4/2015 | Yang .................... G06T 15/205 345/419 |
| 2019/0108625 | A1* | 4/2019 | Imai ....................... G06T 5/008 |

OTHER PUBLICATIONS

Office Action (Non-Final Rejection) dated Apr. 6, 2020 issued in related U.S. Appl. No. 16/153,290.

Related U.S. Appl. No. 16/153,290; First Named Inventor: Shintaro Imai; Title: "Image Processing Apparatus, Image Processing Method, and Recording Medium"; filed Oct. 5, 2018.

\* cited by examiner

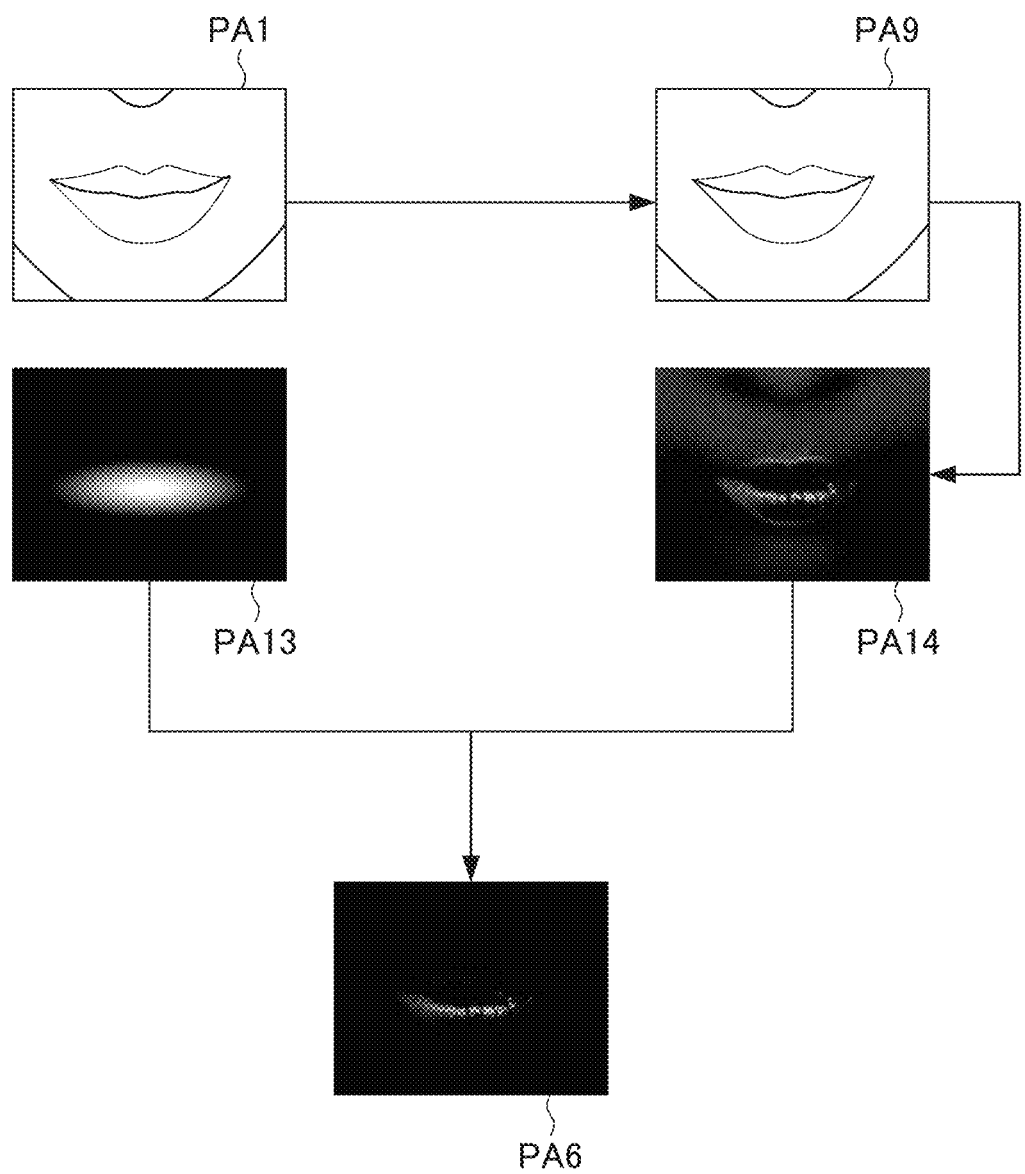

IMAGE PROCESSING APPARATUS, IMAGE PROCESSING METHOD, AND RECORDING MEDIUM

CROSS-REFERENCE TO RELATED APPLICATIONS

This application is based upon and claims the benefit of priority under 35 USC 119 of Japanese Patent Application No. 2017-195425 filed on Oct. 5, 2017 the entire disclosure of which, including the description, claims, drawings, and abstract, is incorporated herein by reference in its entirety.

BACKGROUND OF THE INVENTION

Field of the Invention

The present invention relates to an image processing apparatus, an image processing method, and a recording medium.

Description of the Invention

Conventionally, a process that corrects the hue, saturation, and brightness of a specific region of a face image has been performed. For example, JP 2009-65269 A discloses a technique that corrects the gloss of lips in a face image to be natural. The technique processes a portion on the basis of the state of a strobe or environmental light.

SUMMARY OF THE INVENTION

One aspect of the present invention is 1. An image processing apparatus comprising: a processor, wherein the processor is configured to acquire a face image; adjust brightness of the face image acquired by the acquisition unit; and synthesize the face image acquired by the acquisition unit with the adjusted face image, using map data in which a predetermined region of a face is set as a transparent region on the basis of a reflection state of light emitted to the face.

BRIEF DESCRIPTION OF THE DRAWINGS

FIG. 5 is a diagram schematically illustrating an example of the creation of a gloss enhancement mask image.

DETAILED DESCRIPTION OF THE PREFERRED EMBODIMENTS

Hereinafter, an embodiment of the invention will be described with reference to the drawings.

Figure 1:
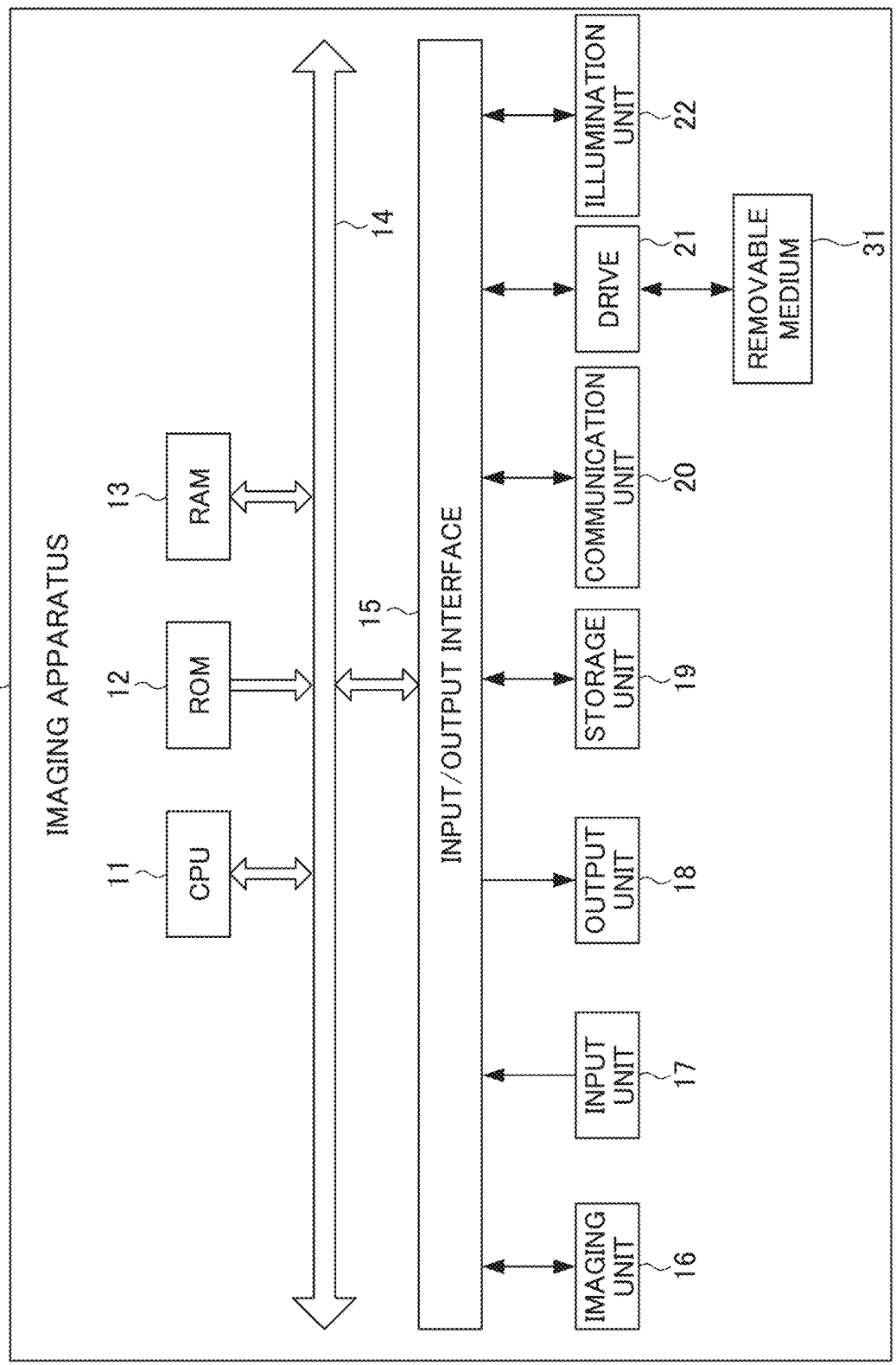
FIG. 1 is a block diagram illustrating the hardware configuration of an imaging apparatus 1 according to an embodiment of an image processing apparatus of the invention.

FIG. 1 is a block diagram illustrating the hardware configuration of an imaging apparatus 1 according to an embodiment of an image processing apparatus of the invention. The imaging apparatus 1 is configured as, for example, a digital camera.

As shown in FIG. 1, the imaging apparatus 1 includes a CPU (Central Processing Unit) 11 serving as a processor, a ROM (Read Only Memory) 12, a RAM (Random Access Memory) 13, a bus 14, an input and output interface 15, an image capture unit 16, an input unit 17, an output unit 18, a storage unit 19, a communication unit 20, a drive 21, and an illumination unit 22.

The CPU 11 executes various processes according to a program recorded in the ROM 12 or a program loaded from the storage unit 19 into the RAM 13.

The RAM 13 also stores data and the like necessary for the CPU 11 to execute various processes as appropriate.

The CPU 11, the ROM 12, and the RAM 13 are mutually connected via the bus 14. The input and output interface 15 is also connected to the bus 14. The input and output interface 15 is also connected to the image capture unit 16, the input unit. 17, the output unit 18, the storage unit 19, the communication unit 20, the drive 21, and the illumination unit 22.

Although not shown, the image capture unit 16 includes an optical lens unit and an image sensor.

The optical lens unit is composed of a lens that collects light, for example, a focus lens, a zoom lens, etc., in order to photograph a subject.

The focus lens is a lens that forms a subject image on the light receiving surface of the image sensor.

The zoom lens is a lens that freely changes the focal length within a certain range.

A peripheral circuit for adjusting setting parameters such as focus, exposure, white balance and the like is provided in the optical lens unit as necessary.

The image sensor is composed of a photoelectric conversion element, an AFE (Analog Front End) and the like.

The photoelectric conversion element is composed of, for example, a CMOS (Complementary Metal Oxide Semiconductor) type photoelectric conversion element or the like. A subject image is incident on the photoelectric conversion element from the optical lens unit.

Therefore, the photoelectric conversion element photoelectrically converts (capture) the subject image, accumulates an image signal for a certain period of time, and sequentially supplies the accumulated image signal to the AFE as an analog signal.

The AFE executes various signal processing such as A/D (Analog/Digital) conversion processing and the like on the analog image signal. A digital signal is generated by various kinds of signal processing and output as an output signal of the image capture unit 16.

Such an output signal of the image capture unit 16 is hereinafter referred to as "captured image data".

Data of the captured image is appropriately supplied to the CPU 11, an image processing unit (not shown), and the like.

The input unit 17 is composed of various buttons and the like, and inputs various information according to an instruction operation by a user.

The output unit 18 includes a display, a speaker, and the like, and outputs images and sounds.

The storage unit 19 is made of a DRAM (Dynamic Random Access Memory) and the like, and stores data of various images.

The communication unit 20 controls communication with other apparatuses (not illustrated) through a network including the Internet.

A removable medium 31 formed of a magnetic disk, an optical disk, a magnetooptical disk, a semiconductor memory, or the like, is suitably mounted on a drive 21.

A program read out from the removable medium 31 by the drive 21, is installed in a storage unit 19, as necessary.

In addition, the removable medium 31 is also capable of recording various data items such as data of an image recorded in the storage unit 109, as with the storage unit 109.

The illumination unit 22 includes eight LEDs (light emitting members) that are provided around the imaging unit 16 in a circular shape and one LED that is provided at a position separated from the eight LEDs in the imaging apparatus 1. These LEDs selectively emit light according to an operation of the user in a case in which a live view image is captured or in a case in which an image is recorded. As such, the arrival direction of beams for illumination is changed and the image of the face is captured.

As such, the arrival direction of beams for illumination is changed and the image of the face is captured. Therefore, it is possible to acquire the face image whose shade has been artificially controlled.

The imaging apparatus 1 having the above-mentioned configuration has a function of generating an image (hereinafter, a "whitened image") in which the skin has been subjected to a whitening process in the captured image of the face and the lips whose color has been lightened to be close to a skin color by the whitening process have been appropriately corrected. That is, the imaging apparatus 1 generates a whitened image in which the color of the lips corrected by the whitening process performed for the skin of the face has been corrected to an appropriate color.

In the whitening process, a portion other than a processing target is masked such that the whitening process is performed only for a skin color region. However, since the color of the lips is close to the skin color and is included in the skin color region, the color of the lips is affected by the whitening process. As a result, for example, the color of the lips is lightened. In addition, the whitening process is mainly performed by correcting three elements, that is, reduction in saturation, an increase in brightness, and the rotation of hue in a blue direction. Therefore, the imaging apparatus 1 according to this embodiment restores only the reduced saturation among the three elements and maintains the other effects to correct the color of the lips to an appropriate color.

In this embodiment, the whitened image is generated by performing the whitening process for the entire face and separately performing color correction for reproducing the color of the lips affected by the whitening process to an appropriate color. In addition, in this embodiment, a correction process of enhancing the gloss of the lips is performed as a process of improving the gloss feeling of the lips. In this case, a process of enhancing the original gloss of the image of a lip region (gloss enhancement process) is performed to reproduce the natural gloss feeling of the lips. In this way, a face image (hereinafter, referred to as a "processed image") subjected to adjustment for improving the gloss feeling of the whitened image without damaging the texture of the lips is generated.

Figure 2:
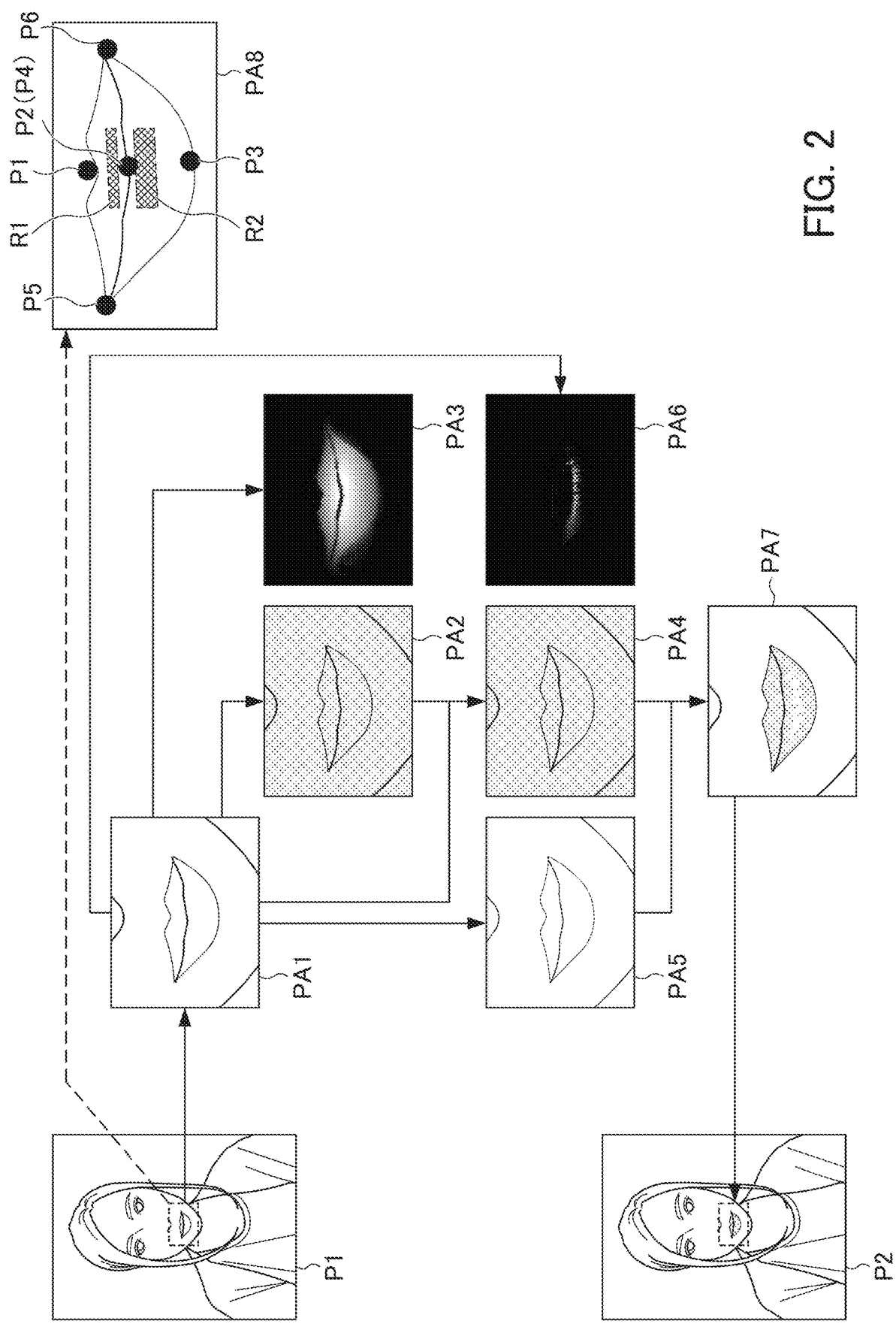
FIG. 2 is a diagram schematically illustrating a processed image generation process in this embodiment.

FIG. 2 is a diagram schematically illustrating the generation of the processed image in this embodiment. For the processed image according to this embodiment, as illustrated in FIG. 2, a region image PA1 including the lips is cropped from an image (hereinafter, referred to as an "original image") P1 which has been entirely subjected to the whitening process. Then, a process of reproducing the color of the lips which has been lightened by the whitening process to an appropriate color is performed for the region image PA1 to create an image (hereinafter, a "color-corrected image") PA2. In the color-corrected image PA2, the color of the entire image other than the lips has been corrected. Therefore, the region image PA1 and the color-corrected image PA2 are synthesized by an α blending process, using a color correction mask image PA3 that masks portions other than the lips, such that the color of only the lips is corrected to create an image (hereinafter, referred to as a "lip-color-corrected image") PA4 in which the color of only the lips has been corrected. The mask image is an image represented by an α value. In this embodiment, a gloss enhancement process for improving the gloss feeling of the lips is performed for the lip-color-corrected image PA4. In the gloss enhancement process, a process of enhancing the original gloss of the lips is performed for a region including the lips to create an image (hereinafter, referred to as a "gloss-enhanced image") PA5. Since the gloss-enhanced image PA5 is obtained by enhancing the gloss of the entire region image PA1, the lip-color-corrected image PA4 and the gloss-enhanced image PA5 are synthesized by α blending, using a gloss enhancement mask image PA6 in which portions other than the lips are masked, such that the gloss of only the lips is enhanced to create an image (hereinafter, referred to as a "lip-gloss-enhanced image") PA7 in which the gloss of only the lips has been enhanced. Then, the created lip-gloss-enhanced image PA7 is synthesized to the crop position of the original image PA1 to generate the processed image P2.

[Creation of Color Correction Mask Image]

Figure 3:
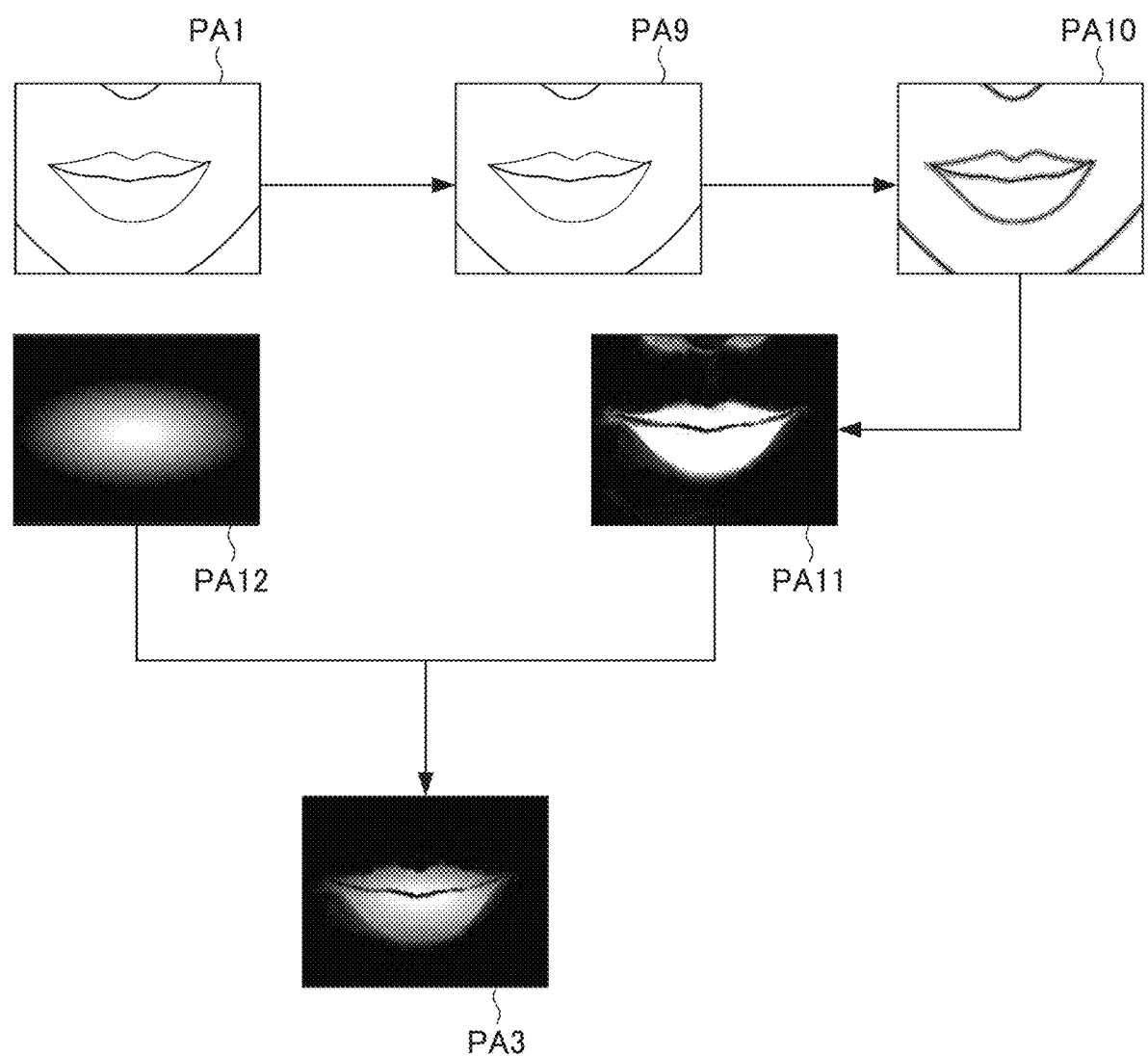
FIG. 3 is a diagram schematically illustrating an example of the creation of a color correction mask image.

FIG. 3 is a diagram schematically illustrating an example of the creation of the color correction mask image PA3. In this embodiment, the color correction mask image PA3 corresponding to a lip region is generated in order to perform a correction process of reproducing the color of a lip portion which has been lightened by the whitening process. As illustrated in FIG. 3, in the color correction mask image PA3, a portion that becomes closer to black has higher transparent intensity (transparency) and a portion that becomes closer to white has lower transparent intensity. The color correction mask image PA3 is an image including pixels with an α value. Therefore, in a case in which the region image PA1 and the color-corrected image PA2 are synthesized using the color correction mask image PA3, the black portion is synthesized such that the region image PA1 is conspicuous and the white portion is synthesized such that the color-corrected image PA2 is conspicuous.

First, the position of the lips is specified by the detection of the organs of the face. Then, the color correction mask image PA3 is created on the basis of a color value having a peak in an HSV color space in a region including the specified position of the lips. In the detection of the organs of the face in this embodiment, as illustrated in an image PA8 of FIG. 2, at least the positions of a total of six points, that is, two points P1 and P2 on the upper and lower sides of the center of the upper lip, two points P3 and P4 on the upper and lower sides of the center of the lower lip, and two points P5 and P6 at the left and right ends of the lips are detected in order to specify, for example, the position of the lips.

In this embodiment, a map that simulates the shape of the lips in advance is synthesized with a color correction mask image PA9 generated on the basis of the color value having a peak in the HSV color space to generate the final color correction mask image PA3 in order to exclude an unnecessary part such as the nose.

Specifically, a HUE map PA11 is created from the region image PA1 and is synthesized with a map PA12 which has been created in advance to create the color correction mask image PA3. In the synthesis of the HUE map PA11 and the map PA12, the minimum value of the pixel values of the HUE map PA11 and the map PA12 is selected in order to remove a spatially unnecessary region from the HUE map PA11.

[Creation of HUE Map]

The HUE map PA11 is a map in which a portion corresponding to the color of the lips in the region image PA1 is specified. First, in the HUE map PA11, a region image in a YUV color space into an HSV (Hue, Saturation or Chroma, and Lightness, or Brightness) color space to generate an image PA9. Then, in order to remove noise, an ε filter is applied to generate an image PA10 and an HSV analysis process is performed. Then, the HUE map PA11 is created using a value calculated from the result of the HSV analysis process as a map value of the HUE map.

In the HSV analysis process, a lip color level weighting table is set in order to determine the map value of each pixel. The lip color level weighting table is set on the basis of histograms created for each of the HSV channels.

Figure 4A:
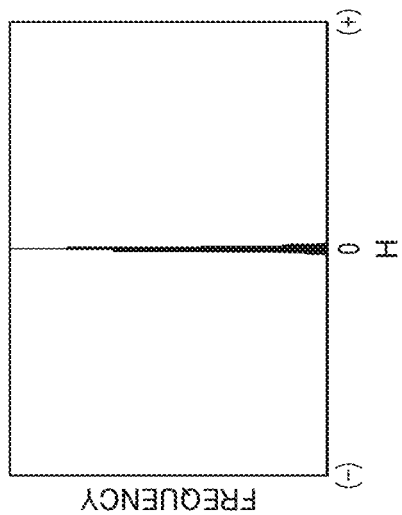
FIG. 4A is a diagram illustrating a hue histogram related to a process of creating a HUE map for color correction.
Figure 4B:
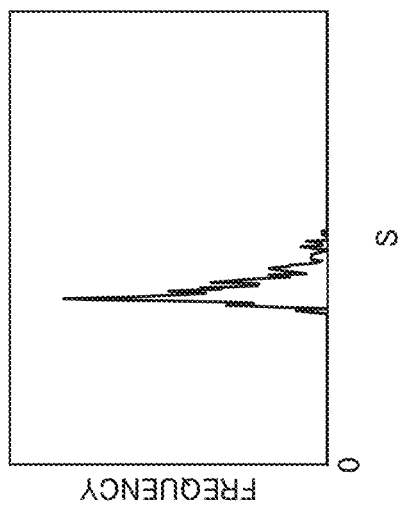
FIG. 4B is a diagram illustrating a saturation histogram related to the process of creating a HUE map for color correction.
Figure 4C:
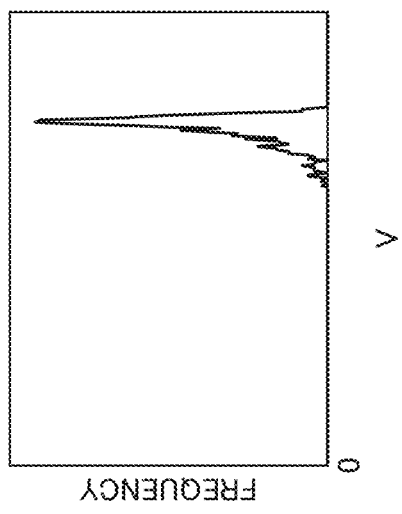
FIG. 4C is a diagram illustrating a brightness histogram related to the process of creating a HUE map for color correction.

FIGS. 4A to 4F are diagrams illustrating the histograms and the lip color level weighting tables related to a process of creating a HUE map for color correction. This color correction is lip color correction. In the setting of the lip color level, first, measurement regions R1 and R2 are set as measurement regions in the vicinity of the centers of the upper and lower lips from the points P1 to P6 detected by the organ detection illustrated in the image PA8 of FIG. 2 and HSV histograms in each measurement region illustrated in FIGS. 4A to 4C are created. In addition, for the measurement regions of the lips related to the creation of the histograms, the number of regions and the shape, position, and size of the regions are not particularly limited as long as the color of the lips can be acquired from the regions.

Figure 4D:
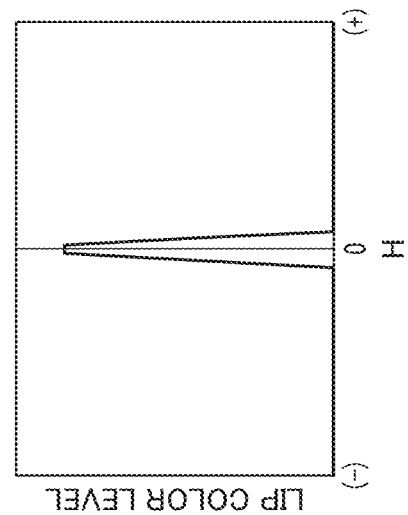
FIG. 4D is a diagram illustrating a lip color level hue weighting table related to the process of creating a HUE map for color correction.
Figure 4E:
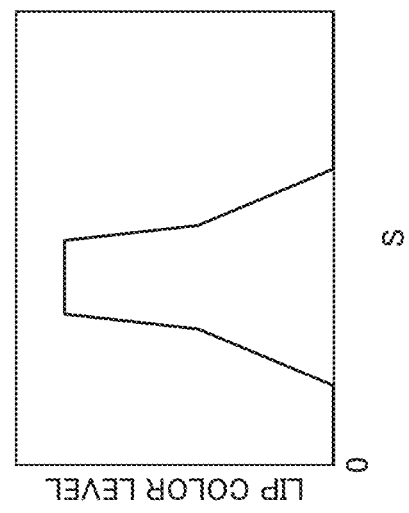
FIG. 4E is a diagram illustrating a lip color level saturation weighting table related to the process of creating a HUE map for color correction.
Figure 4F:
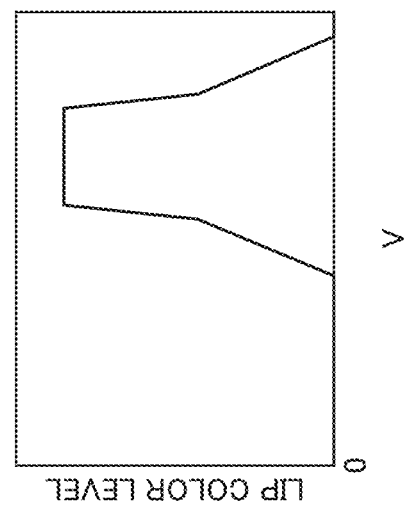
FIG. 4F is a diagram illustrating a lip color level brightness weighting table related to the process of creating a HUE map for color correction.

Then, the lip color level weighting tables are set so as to correspond to the modes of the HSV histograms illustrated in FIGS. 4A to 40, as illustrated in FIGS. 4D to 4F. In the case of a hue (H) channel, the weighting table is set such that weighting values are equally divided into positive and negative values on the basis of the mode and the weighting value becomes smaller as it becomes further away from the mode (FIG. 4D). In addition, in the case of saturation (S) and brightness (V) channels, the weighting table is set such that the peak value of the weighting value has a predetermined width from the upper left end (right end) corresponding to the mode of the histogram and is inclined in two stages, that is, first and second stages (FIGS. 4E and 4F). In the two-stage inclination, the gradient of the second stage is less than the gradient of the first stage.

Then, the product of the lip color levels calculated for each of the HSV channels according to the weighting value for each pixel is used as a map value and the HUE map PA11 is created using the map value. The map value of the HUE map is calculated by the following Expression (1). Map Value (Map) of $$\text{HUE Map} = Lh \times Ls \times Lv \quad (1)$$

Here, "Lh" indicates the lip color level of H, "Ls" indicates the lip color level of S, and "Lv" indicates the lip color level of V.

[Creation of Gloss Enhancement Mask Image]

FIG. 5 is a diagram schematically illustrating an example of the creation of the gloss enhancement mask image PA6. In this embodiment, a mask image corresponding to the lip region is generated in order to perform a process of enhancing the original gloss of the lips. As illustrated in FIG. 5, in the gloss enhancement mask image PA6, a portion that becomes closer to black has higher transparent, intensity and a portion that becomes closer to white has lower transparent intensity. The gloss enhancement mask image PA6 is an image including pixels with an α value. Therefore, in a case in which the lip-color-corrected image PA4 and the gloss-enhanced image PA5 are synthesized using the gloss enhancement mask image PA6, the black portion is combined such that the lip-color-corrected image PA4 is conspicuous and the white portion is synthesized such that the gloss-enhanced image PA5 is conspicuous.

First, the position of the lips is specified by the detection of the organs of the face. Then, the gloss enhancement mask image PA6 is created on the basis of a color value having a peak in the HSV color space in a region including the specified position of the lips. In the detection of the organs of the face in this embodiment, as illustrated in the image PA8 of FIG. 2, at least the positions of a total of six points, that is, two points P1 and P2 on the upper and lower sides of the center of the upper lip, two points P3 and P4 on the upper and lower sides of the center of the lower lip, and two points P5 and P6 at the left and right ends of the lips are detected in order to specify, for example, the position of the lips.

In this embodiment, a map PA13 that simulates the shape of the dips in advance is synthesized with a provisional gloss enhancement mask image PA6 generated on the basis of the color value having a peak in the HSV color space to generate the final gloss enhancement mask image PA6 in order to exclude an unnecessary part such as the nose.

Specifically, a HUE map PA14 is created from the region image PA1 and is synthesized with the map PA13 which has been created in advance to create the gloss enhancement mask image PA6 according to this embodiment. In the synthesis of the HUE map PA14 and the map PA13, the minimum value of the pixel values of the HUE map PA14 and the map PA13 is selected.

[Creation of HUE Map]

The HUE map PA14 is a map in which a portion corresponding to the color of the lips in the region image PA1 described with reference to FIG. 3 has been specified. In the case illustrated in FIG. 5, lip gloss level weighting tables are set on the basis of the histograms created for each of the HSV channels.

Figure 6C:
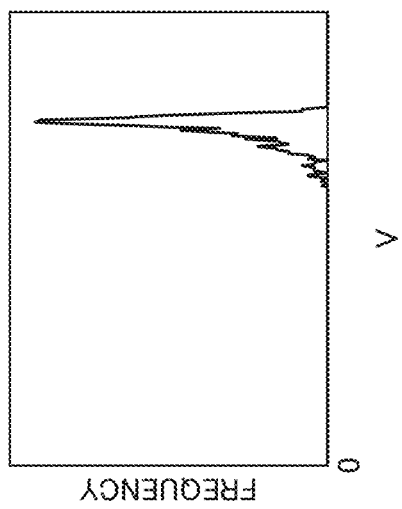
FIG. 6C is a diagram illustrating a brightness histogram related to the process of creating a HUE map for gloss enhancement.
Figure 6B:
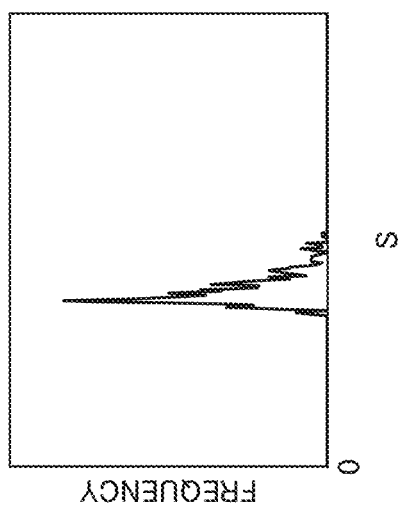
FIG. 6B is a diagram illustrating a saturation histogram related to the process of creating a HUE map for gloss enhancement.
Figure 6A:
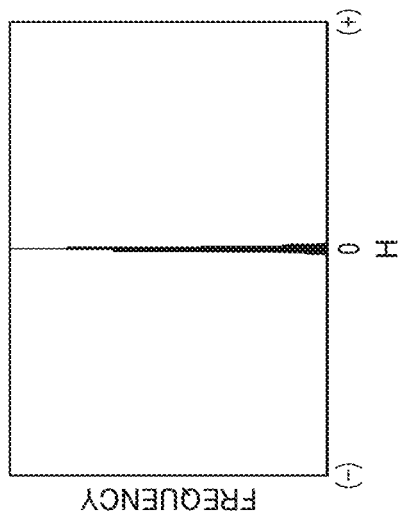
FIG. 6A is a diagram illustrating a hue histogram related to a process of creating a HUE map for gloss enhancement.

FIGS. 6A to 6F are diagrams illustrating the histograms and the lip gloss level weighting tables related to a process of creating a HUE map for gloss enhancement. In the setting of the lip gloss levels, first, the measurement regions R1 and R2 are set as the measurement regions in the vicinity of the centers of the upper and lower lips from the points P1 to P6 detected by the organ detection illustrated in the image PA8 of FIG. 2 and HSV histograms in each measurement region illustrated in FIGS. 6A to 6O are created. In addition, for the measurement regions of the lips related to the creation of the histograms, the number of regions and the shape, position, and size of the regions are not particularly limited as long as the gloss of the lips can be acquired from the regions.

Figure 6F:
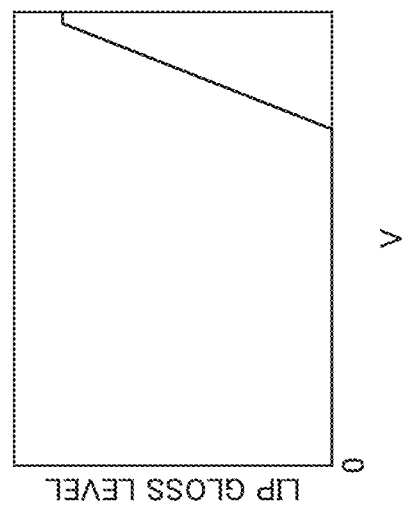
FIG. 6F is a diagram illustrating a lip color level brightness weighting table related to the process of creating a HUE map for gloss enhancement.
Figure 6E:
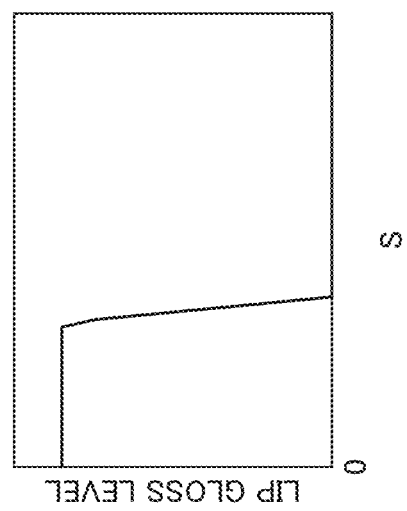
FIG. 6E is a diagram illustrating a lip color level saturation weighting table related to the process of creating a HUE map for gloss enhancement.
Figure 6D:
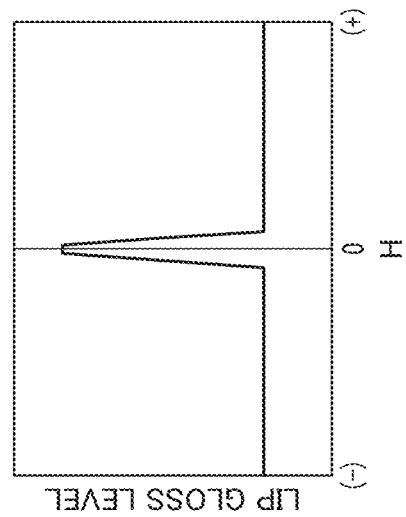
FIG. 6D is a diagram illustrating a lip color level hue weighting table related to the process of creating a HUE map for gloss enhancement.

Then, the lip gloss level weighting tables are sell so as to correspond to the modes of the HSV histograms illustrated in FIGS. 6A to 6C as illustrated in FIGS. 6D to 6F. In the case of the hue (H) channel, the weighting table is set such that weighting values are equally divided into positive and negative values on the basis of the mode and the weighting value becomes smaller as it becomes further away from the mode (FIG. 6D). In addition, in the case of the saturation (S) channel, the weighting table is set such that the weighting value is maintained at a normal level (saturation level) until it reaches the mode of the histogram, rapidly and monotonously decreases from immediately before it reaches the mode to the mode, and is maintained at a zero level thereafter (FIG. 6E). In the case of the brightness (V) channel, the weighting table is set such that the weighting value is maintained at a zero level until it reaches the mode of the histogram and rapidly and monotonously increases to the saturation level thereafter (FIG. 6F).

Then, the product of the lip color levels calculated for each of the HSV channels according to the weighting value for each pixel is used as the map value and the HUE map PA14 is created using the map value. That is, the map value of the HUE map PA14 is calculated by the above-mentioned Expression (1).

[Creation of Map]

FIG. 7 is a diagram schematically illustrating the creation of the map.

Figure 7A:
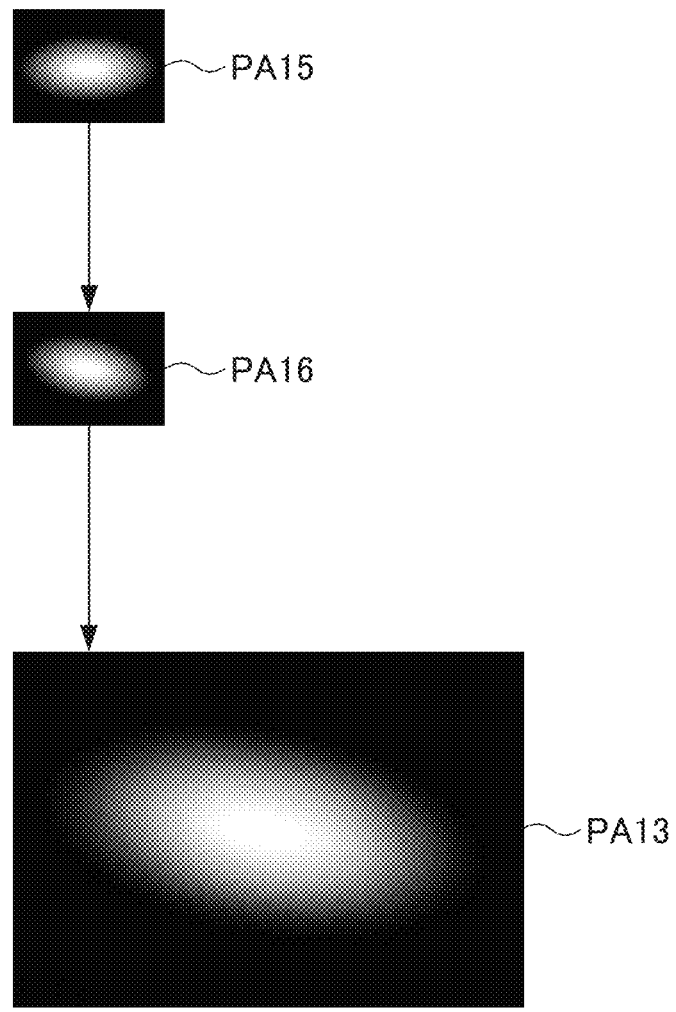
FIG. 7A is a diagram schematically illustrating an example of the creation of a map.
Figure 7B:
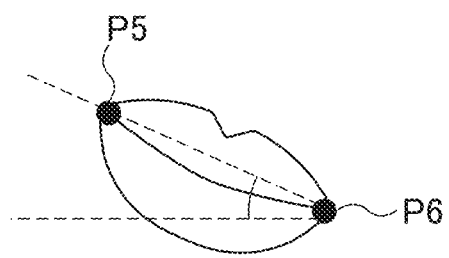
FIG. 7B is a diagram schematically illustrating the angle adjustment of a lip portion.

The map is a map that simulates the form of the lips of a general face and is created in advance in a case in which color correction is performed. As illustrated in FIG. 7A, for the map, a map PA15 with a reduced size is developed from data. Then, as illustrated in FIG. 7B, the inclination angle of the lips is calculated from the contour information (the position of two points P5 and P6 in this embodiment) of the lips in the image and the map is rotated by the angle to generate a map PA16. Finally, the map PA16 is resized to a size corresponding to the image. Then, the map PA13 is synthesized with the HUE map PA14 in order to remove a portion, such as the nose, other than the lips in the HUE map PA14. At the time of synthesis, the minimum value of the pixel values of the HUE map PA14 and the map PA13 is selected.

[Creation of Color-Corrected Image]

The color-corrected image PA2 is created by correcting the region image PA1 with correction intensity that has been determined according to a V value of the YUV color space measured from a skin region below the left and right pupils detected by organ detection. The skin region below the left and right pupils is a position where a dark ring below the eyes is avoided and is determined as a position where the color of the skin is most fully expressed in the face. Various positions may be used as long as the color of the skin in the face can be extracted from the positions. In a case in which the original color of the lips is deep due to, for example, lipstick, the value (V) of the pixels of the lips is corrected such that the color is not excessively corrected.

[Creation of Lip-Color-Corrected Image]

The lip-color-corrected image PA4 is created by synthesizing the color-corrected image PA2 and the region image PA1 on the basis of the color correction mask image PA3, using α blending. That is, the lip-color-corrected image PA4 in which the color of only the lip region has been corrected is generated.

[Creation of Gloss-Enhanced Image]

The gloss-enhanced image PA5 is created by performing a correction process of smoothing the skin of the lip region with a bilateral filter (or other smoothing filters) and performing a process (gloss enhancement) of applying a gain corresponding to the number of pixels of a gloss portion of the lip region to increase luminance. In this case, for example, it is possible to apply the bilateral filter to a luminance component of the pixel. For example, it is possible to count the number of pixels of the gloss portion of the lip region (for example, the number of pixels with luminance equal to or greater than a threshold value and to apply a gain corresponding to the counted number of pixels. However, in a case in which the proportion of the gloss portion to the lip region is high, the gain corresponding to the number of pixels may be suppressed.

[Creation of Lip-Gloss-Enhanced Image]

The lip-gloss-enhanced image PA7 is created by synthesizing the gloss-enhanced image PA5 and the lip-color-corrected image PA4 on the basis of the gloss enhancement mask image PA6, using α blending. That is, the lip-gloss-enhanced image in which the gloss of only the gloss portion of the lips has been enhanced and the other skin portion has been subjected to the whitening process is generated.

Figure 8:
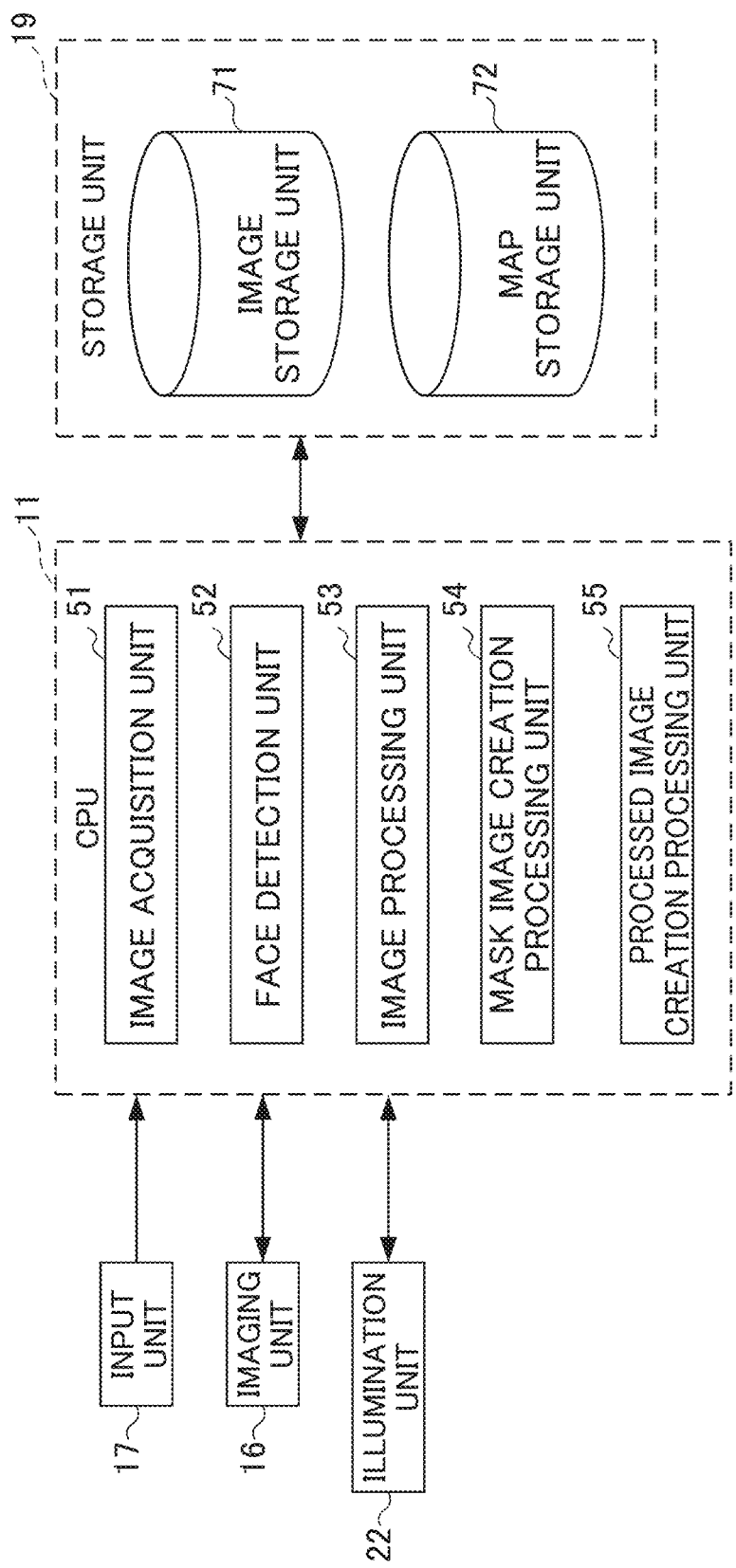
FIG. 8 is a functional block diagram illustrating a functional configuration for performing a processed image generation process in the functional configurations of the imaging apparatus 1 illustrated in FIG. 1.

FIG. 8 is a functional block diagram illustrating a functional configuration for performing a processed image generation process among the functional configurations of the imaging apparatus 1 illustrated in FIG. 1. The processed image generation process means a series of processes which performs the whitening process and the lip color correction process for the captured image including the face of a person, performs the gloss enhancement process of the original gloss of the image of the lip region, and synthesizes the processed image with the original image P1 to generate the processed image PA2.

In a case in which the gloss-enhanced image generation process is performed, an image acquisition unit 51, a face detection unit 52, an image processing unit 53, a mask image creation processing unit 54, and a processed image creation processing unit 55 function in the CPU 11 as illustrated in FIG. 8.

In addition, an image storage unit 71 and a map storage unit 72 are set in a region of the storage unit 19.

The data of the image output from the imaging unit 16 is stored in the image storage unit 71. The data of the map used to create the mask image is stored in the map storage unit 72. The map is formed in an arc shape that simulates the lips. Therefore, in order to reduce the amount of data, the arc of the map may be divided into four parts and data corresponding to a quarter of the arc may be stored. In this case, the maps are developed to form the arc shape at the time of processing.

The image acquisition unit 51 acquires the data of the captured image obtained by performing a developing process for the image captured by the imaging unit 16 or the data of the image to be processed from the image storage unit 71.

The face detection unit 52 detects the face from the image and detects each organ forming the face in the detected face. The face detection unit 52 detects at least the left and right pupils and the organs of the face from a contour shape. In addition, for the lips, the face detection unit 52 detects the positions of a total of six points, that is, two points P1 and P2 on the upper and lower sides of the center of the upper lip, two points P3 and P4 on the upper and lower sides of the center of the lower lip, and two points P5 and P6 at the left and right ends of the lips. The face and each organ can be detected by the known techniques, such as the existing face detection technique and the existing organ detection technique. In addition, the face and each organ may be detected by any detection method as long as the detection method is based on information different from the color information of the HSV color space. For example, a luminance detection method and a contour extraction method may be used.

The image processing unit 53 performs various types of image processing for the original image. Specifically, for example, the image processing unit 53 mainly performs a whitening process of correcting three elements, that is, a reduction in saturation, an increase in value, and the rotation of hue in a blue direction. In addition, as illustrated in FIG. 2, the image processing unit 53 crops the region image PA1 from the original image P1. The image processing unit 53 synthesizes the cropped region image PA1 and the created color-corrected image PA2 on the basis of the created color correction mask image PA3, using α blending. As a result, the lip-color-corrected image PA4 is created.

In addition, the image processing unit 53 synthesizes the lip-color-corrected image PA4 and the created gloss-enhanced image PA5 on the basis of the created gloss enhancement mask image PA6, using the α blending. As a result, the lip-gloss-enhanced image PA7 is created. Further, the image processing unit 53 attaches the lip-gloss-enhanced image PA7 to the crop position of the original image P1 to generate the processed image P2.

The mask image creation processing unit 54 generates a mask image, using α blending, such that an image in which only the lip region has been corrected is obtained. In this embodiment, the mask image creation processing unit 54 generates two types of mask images (the color correction mask image PA3 and the gloss enhancement mask image PA6) which have been described above.

In a case in which the color correction mask image PA3 is generated, the mask image creation processing unit 54 converts image parameters of the region image PA1 from the YUV color space to the HSV color space, as illustrated in FIG. 3. In addition, the mask image creation processing unit 54 performs a process of blurring the image with an ε filter in order to remove noise.

Furthermore, the mask image creation processing unit 54 performs an HSV analysis process. The HSV analysis process creates histograms in each of the HSV channels of the measurement regions R1 and R2 set in the vicinity of the centers of the upper and lower lips (see FIGS. 4A to 4C). Then, the lip color level weighting table calculated from the created histograms is created (see FIGS. 4D to 4F). Then, the map value of the HUE map in each pixel is calculated on the basis of the created lip color level weighting table, using the above-mentioned Expression (1). The HUE map PA11 for color correction is created from the calculated map value of each pixel.

In a case in which the gloss enhancement mask image PA6 is generated, the mask image creation processing unit 54 converts the image parameters of the region image PA1 from the YUV color space to the HSV color space, as illustrated in FIG. 5. In addition, the mask image creation processing unit 54 performs the HSV analysis process. The HSV analysis process creates histograms in each of the HSV channels of the measurement regions R1 and R2 set in the vicinity of the centers of the upper and lower lips (see FIGS. 6A to 6C). Then, the lip color level weighting table calculated from the created histograms is created (see FIGS. 6D to 6F). Then, the map value of the HUE map in each pixel is calculated on the basis of the created lip color level weighting table, using the above-mentioned Expression (1). The HUE map PA14 for gloss enhancement is created from the calculated map value of each pixel.

In addition, the mask image creation processing unit 54 performs angle adjustment and size adjustment such that the map stored in the map storage unit 72 corresponds to the lips of the region image as illustrated in FIGS. 7A and 7B.

Furthermore, the mask image creation processing unit 54 synthesizes the map PA12 subjected to the angle adjustment and the size adjustment with the created HUE map PA11 for color correction as illustrated in FIG. 3. At that time, the mask image creation processing unit 51 performs the synthesis such that the minimum value of the pixel values of the HUE map PA11 for color correction and the map PA12 is selected, in order to remove a spatially unnecessary region, such as the nose, from the HUE map. As a result of the synthesis, the color correction mask image PA3 is created.

Further, the mask image creation processing unit 54 synthesizes the map PA13 subjected to the angle adjustment and the size adjustment with the created HUE map PA14 for gloss enhancement as illustrated in FIG. 5. At that time, the mask image creation processing unit 54 performs the synthesis such that the minimum value of the pixel values of the HUE map PA14 for gloss enhancement and the map PA13 is selected, in order to remove a spatially unnecessary region, such as the nose, from the HUE map. As a result of the synthesis, the gloss enhancement mask image PAC is created.

The processed image creation processing unit 55 performs a color correction process and a gloss enhancement process for the region image PA1 In the color correction process, the processed image creation processing unit 55 measures the brightness (V) of a skin region below the detected left and right pupils. Then, the processed image creation processing unit 55 performs color correction for the region image PA1 according to the measured V value. As a result, the color-corrected image PA2 obtained by correcting the color of the region image PA1 is created. In the gloss enhancement process, the processed image creation processing unit 55 performs a correction process of smoothing the skin of the lip region for the region image PA1, using a bilateral filter (or other smoothing filters). In this case, for example, the bilateral filter can be applied to a luminance component of the pixel. In addition, the processed image creation processing unit 55 performs a process (gloss enhancement process) of applying a gain corresponding to the number of pixels of a gloss portion of the lip region to increase luminance. In this case, for example, the processed image creation processing unit 55 can count the number of pixels of the gloss portion of the lip region (for example, the number of pixels with luminance equal to or greater than the threshold value) and apply a gain corresponding to the counted number of pixels. However, in a case in which the proportion of the gloss portion to the lip region is high, the gain corresponding to the number of pixels may be suppressed in order to prevent overcorrection. As a result of the process, the gloss-enhanced image PA5 in which the gloss of the region image has been enhanced is created.

Figure 9:
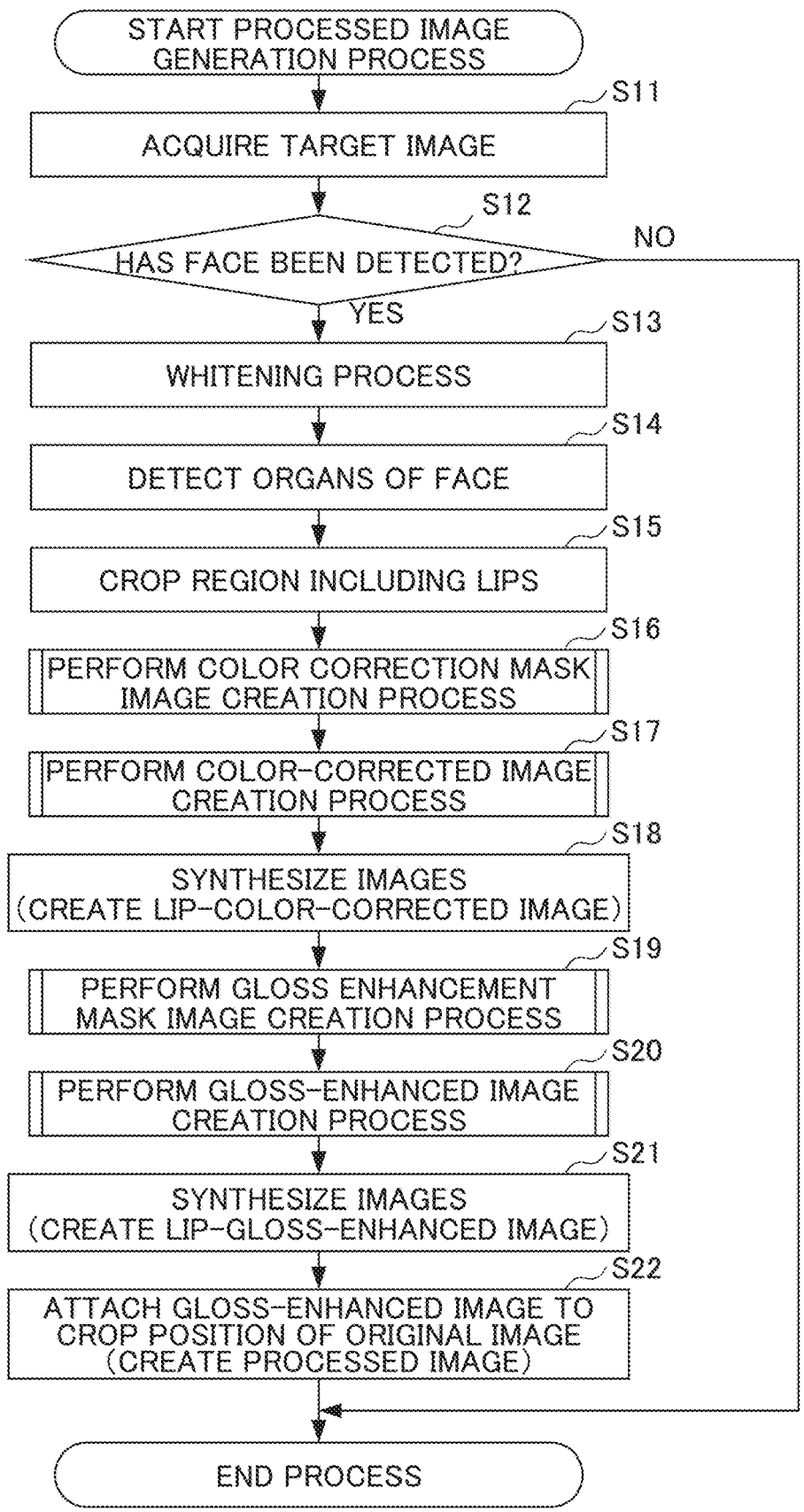
FIG. 9 is a flowchart illustrating the flow of the processed image generation process performed by the imaging apparatus illustrated in FIG. 1 which has the functional configuration illustrated in FIG. 8.

FIG. 9 is a flowchart illustrating the flow of the processed image generation process performed by the imaging apparatus illustrated in FIG. 1 which has the functional configuration illustrated in FIG. 8. The processed image generation process includes a gloss-enhanced image generation process. The processed image generation process starts in response to the detection of the operation of starting the processed image generation process which has been input to the input unit 17 by the user. The processed image generation process is performed for the data of the image captured by the imaging unit 16 in response to an imaging instruction operation or the data of the captured image subjected to a development process. In addition, the data of the captured image stored in the image storage unit 71 may be selected and the processed image generation process may be performed for the data of the selected captured image.

The image acquisition unit 51 acquires the data of the image that has been captured by the imaging unit 16 and then developed or the original image to be processed from the image storage unit 71 (Step S11).

The face detection unit 52 detects a face in the original image and determines whether a face has been detected (Step S12). In a case in which it is determined that a face has not been detected (Step S12: NO), the processed image generation process ends. In a case in which it is determined that a face has been detected (Step S12: YES), the process proceeds to Step S13.

The image processing unit 53 performs the whitening process for the original image (Step S13). The whitening process reduces the saturation of the original image, increases the brightness of the original image, and rotates hue in the blue direction.

The face detection unit 52 detects the organs of the detected face (Step S14). As a result, at least the positions of the left and right pupils and the organs of the face in the original image are detected.

The image processing unit 53 crops a region including the detected lips (Step S15).

The mask image creation processing unit 54 performs a color correction mask image creation process (Step S16). The color correction mask image creation process is performed to create a color correction mask image for α blending. The color correction mask image creation process will be described in detail below.

The processed image creation processing unit 55 performs a color-corrected image creation process (Step S17). The color-corrected image creation process corrects the lightened color of the lips in the region image to an appropriate color to create a color-corrected image. The color-corrected image creation process will be described in detail below.

The image processing unit 53 synthesizes the region image and the created color-corrected image on the basis of the created color correction mask image, using α blending (Step S18). As a result, a lip-color-corrected image in which the color of only a lip portion has been corrected is created.

The mask image creation processing unit 54 performs a gloss enhancement mask image creation process (Step S19). The gloss enhancement mask image creation process is performed to create a gloss enhancement mask image for α blending. The gloss enhancement mask image creation process will be described in detail below.

The processed image creation processing unit 55 performs a gloss-enhanced image creation process (Step S20). The gloss-enhanced image creation process enhances the original gloss of the lips in the region image to create a gloss-enhanced image. The gloss-enhanced image creation process will be described in detail below.

The image processing unit 53 synthesizes the lip-color-corrected image and the created gloss-enhanced image on the basis of the created gloss enhancement mask image, using α blending (Step S21). As a result, a gloss-enhanced image in which the texture of the lip portion is maintained and a gloss feeling has been improved is created.

The image processing unit 53 attaches the gloss-enhanced image to the crop position of the original image (Step S22). As a result, a processed image in which the skin has been subjected to the whitening process, the lip portion has been corrected to an appropriate color, and the gloss feeling of the lip portion has been improved is generated. Then, the processed image generation process ends.

Figure 10:
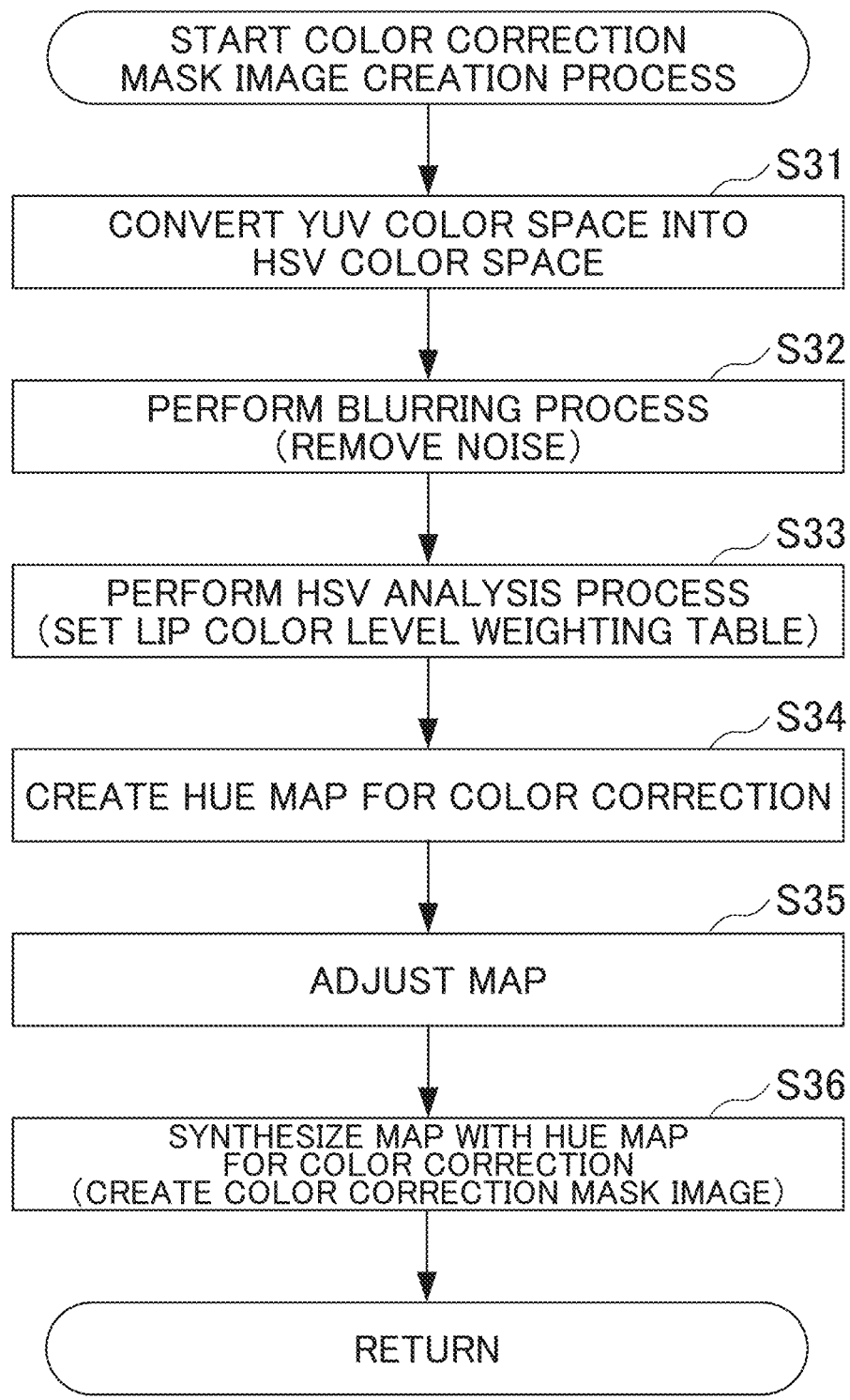
FIG. 10 is a flowchart illustrating the flow of a color correction mask image creation process in the processed image generation process.

FIG. 10 is a flowchart illustrating the flow of the color correction mask image creation process in the processed image generation process.

The mask image creation processing unit 54 converts the YUV color space of the region image into the HSV color space (Step S31).

The mask image creation processing unit 54 performs a blurring process with the ε filter (Step S32).

The mask image creation processing unit 54 performs the HSV analysis process (Step S33). The HSV analysis process creates histograms in each of the HSV channels of the measurement regions R1 and R2 set in the vicinity of the centers of the upper and lower lips as illustrated in image PA8 of FIG. 2 (see FIGS. 4A to 4C). Then, the lip color level weighting table calculated the created histograms s set (see FIGS. 4D to 4F). In the case of the hue (H) channel, the lip color level weighting table is set such that the weighting values are equally divided into positive and negative values on the basis of the mode and the weighting value becomes smaller as it becomes further away from the mode. In the case of the saturation (S) and brightness (V) channels, the weighting table is set such that the peak value of the weighting value has a predetermined width from the upper left end (right end) corresponding to the mode of the histogram and is inclined in two stages, that is, the first and second stages. In the two-stage inclination, the gradient of the second stage is less than the gradient of the first stage.

The mask image creation processing unit 54 creates a HUE map for color correction (Step S34). The map value of the HUE map for color correction is calculated by the above-mentioned. Expression (1) on the basis of the created lip color level weighting value.

The mask image creation processing unit 54 performs angle adjustment and size adjustment such that the map stored in the map storage unit 72 corresponds to the lips of the region image (Step S35).

The mask image creation processing unit 54 synthesizes the map subjected to the angle adjustment and the size adjustment with the created HUE map for color correction. (Step S36). At that time, the mask image creation processing unit 54 performs the synthesis such that the minimum value of the pixel values of the HUE map for color correction and the map is obtained, in order to remove a spatially unnecessary region, such as the nose, from the HUE map. As a result of synthesis, the color correction mask image is created.

Figure 11:
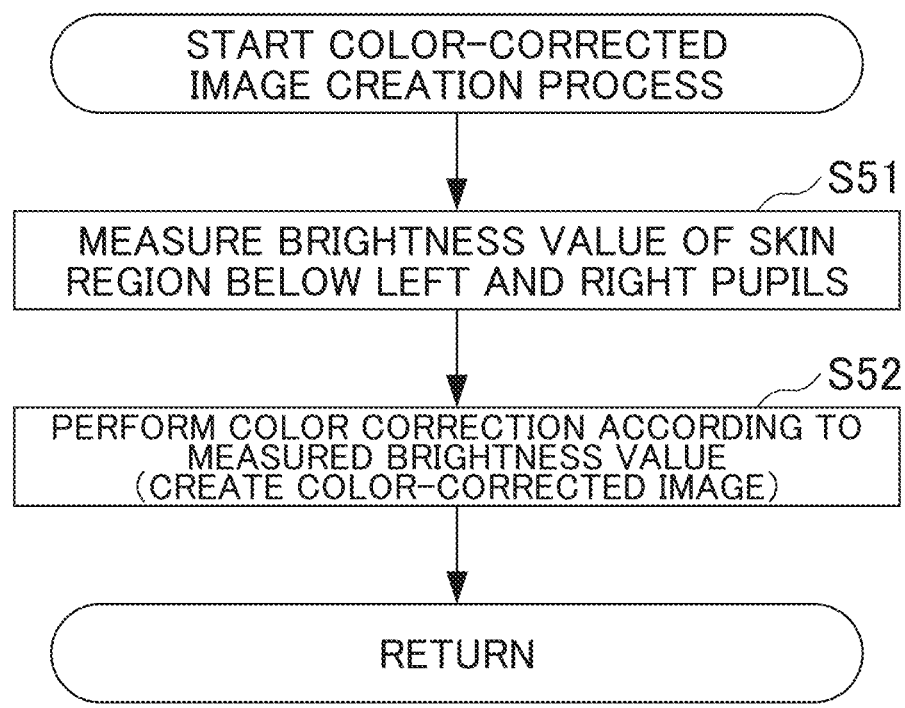
FIG. 11 is a flowchart illustrating the flow of a color-corrected image creation process in the processed image generation process.

FIG. 11 is a flowchart illustrating the flow of the color-corrected image creation process in the processed image generation process.

The processed image creation processing unit 55 measures the brightness (V) of a skin region below the detected left and right pupils (Step S51).

The processed image creation processing unit 55 performs color correction for the region image according to the measured brightness value (Step S52). As a result, the color-corrected image obtained by correcting the color of the region image is created.

Figure 12:
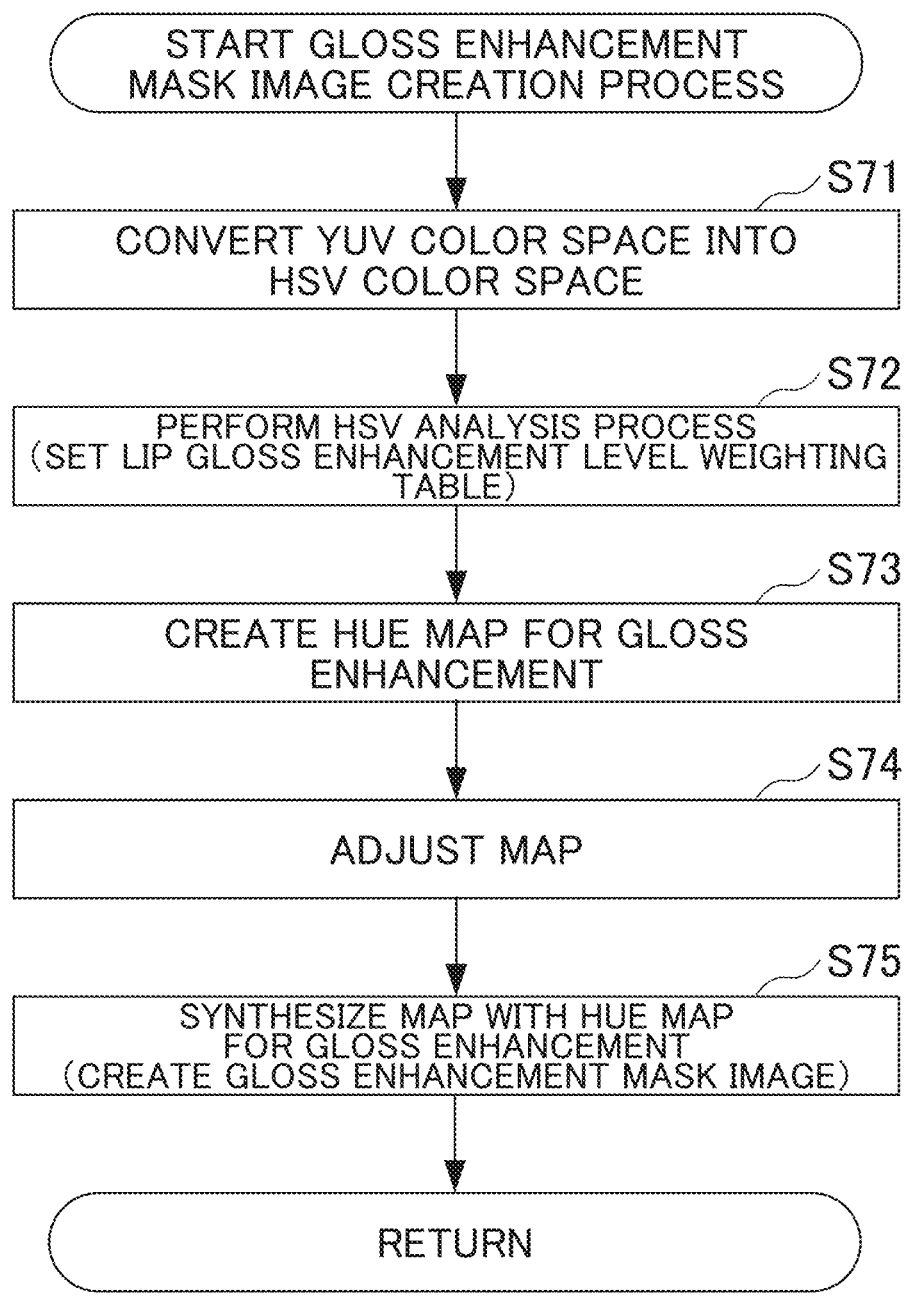
FIG. 12 is a flowchart illustrating the flow of a gloss enhancement mask image creation process in the processed image generation process.

FIG. 12 is a flowchart illustrating the flow of the gloss enhancement mask image creation process in the processed image generation process.

The mask image creation processing unit 54 converts the UV color space of the region image into the HSV color space (Step S71).

The mask image creation processing unit 54 performs the HSV analysis process (Step S72). The HSV analysis process creates histograms in each of the HSV channels of the measurement regions R1 and R2 set in the vicinity of the centers of the upper and lower lips as illustrated in the image PA8 of FIG. 2 (see FIGS. 6A to 6C). Then, the lip color level weighting table calculated from the created histograms is set (see FIGS. 6D to 6F). In the case of the hue (H) channel, the lip gloss level weighting table is set such that the weighting values are equally divided into positive and negative values on the basis of the mode and the weighting value becomes smaller as it becomes further away from the mode. In addition, in the case of the saturation (S) channel, the weighting table is set such that the weighting value is maintained at a normal level (saturation level) until it reaches the mode of the histogram, rapidly and monotonously decreases from immediately before it reaches the mode and to the mode, and is maintained at a zero level thereafter. In the case of the brightness (V) channel, the weighting table is set such that the weighting value is maintained at a zero level until it reaches the mode of the histogram and rapidly and monotonously increases to the saturation level thereafter.

The mask image creation processing unit 54 creates a HUE map for gloss enhancement (Step S73). The map value of the HUE map for gloss enhancement is calculated on the basis of the created lip gloss enhancement level weighting value, using the above-mentioned Expression (1).

The mask image creation processing unit 54 performs angle adjustment and size adjustment such that the map stored in the map storage unit 72 corresponds to the lips of the region image (Step S74).

The mask image creation processing unit 54 synthesizes the map subjected to the angle adjustment and the size adjustment with the created HUE map for gloss enhancement (Step S75). At that time, the mask image creation processing unit 54 performs the synthesis such that the minimum value of the pixel values of the HUE map for gloss enhancement and the map is selected, in order to remove a spatially unnecessary region, such as the nose, from the HUE map. As a result of synthesis, the gloss enhancement mask image is created.

Figure 13:
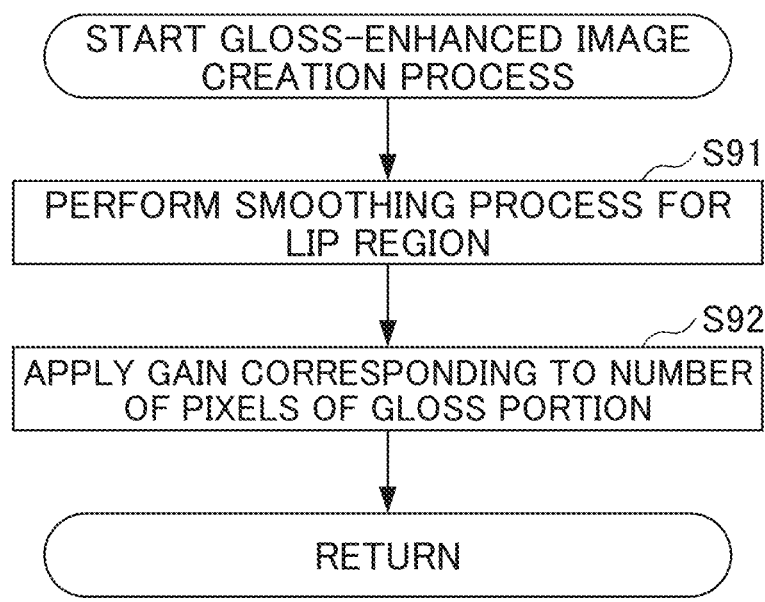
FIG. 13 is a flowchart illustrating the flow of a gloss-enhanced image creation process in the processed image generation process.

FIG. 13 is a flowchart illustrating the flow of the gloss-enhanced image creation process in the processed image generation process.

The processed image creation processing unit 55 performs a correction process of smoothing the skin of the lip region, using a bilateral filter (or other smoothing filters) (Step S91).

The processed image creation processing unit 55 performs a process (gloss enhancement process) of applying a gain corresponding to the number of pixels of a gloss portion of the lip region to increase luminance (Step S92). In a case in which the proportion of the gloss portion to the lip region is high, the gain corresponding to the number of pixels may be suppressed in order to prevent overcorrection. As a result, the gloss-enhanced image in which the gloss of the region image has been enhanced is created.

Various imaging apparatuses have a function that enables the user to select a skin color. For example, the imaging apparatus is configured such that the user can select a "natural" mode for improving the complexion of the face or a "whitening" mode for whitening the color of the face. The natural mode reproduces a bright color. Therefore, in the natural mode, it is possible to make the color of the lips bright. In contrast, the whitening mode reduces the saturation of the skin color. Therefore, the color of the lips is also lightened by the whitening mode and the face is likely to looks pale. Therefore, the imaging apparatus 1 according to this embodiment can extract a lip region from a detected face region on the basis of the detection result of the contour of the captured image of a person and make the color of the lips clear or correct the color as if lip gloss is applied. In a case in which a lip color region is extracted, an image (HSV image) represented by the HSV color space is analyzed and a mask image for α blending is created from the HSV image. At the time of correction, an image represented by the YUV color space can be analyzed and correction can be performed in each of YUV (particularly, V). In addition, the imaging apparatus 1 according to this embodiment enhances the original gloss of the lips to create a lip-gloss-enhanced image. The lip-gloss-enhanced image is synthesized with the original image to obtain a processed image in which a gloss feeling has been improved.

The imaging apparatus 1 having the above-mentioned configuration includes the image acquisition unit 51, the image processing unit 53, the mask image creation processing unit 54, and the processed image creation processing unit 55. The image acquisition unit 51 acquires a face image. The image processing unit 53 performs a whitening process of whitening the color of the skin for a face region of a person included in the image. In the whitening process, the brightness of the face image is adjusted. In addition, the image processing unit 53 creates a lip-gloss-enhanced image in which the gloss of the lips has been appropriately reproduced. The mask image creation processing unit 54 specifies a portion in which the intensity of the whitening process needs to be reduced in the face region of the person subjected to the whitening process. In addition, the mask image creation processing unit 54 specifies a portion in which the gloss of the lips needs to be enhanced. The region specified by the mask image creation processing unit 54 is a predetermined region of the face that is specified on the basis of the reflection state of light emitted to the face. The predetermined region is a transparent region that is not shielded by the color correction mask or the gloss enhancement mask generated by the mask image creation processing unit 54. In other words, the predetermined region is a region that is defined by map data specifying the transparent region. The image processing unit 53 synthesizes the acquired face image and the processed image for the predetermined region. The processed image creation processing unit 55 performs gloss enhancement for the specified portion in which the gloss of the lips needs to be enhanced. In this way, the imaging apparatus 1 creates a processed image that is a face image in which the gloss feeling of the lips has been improved.

In the map data specifying the transparent region, transparency has been adjusted for a predetermined hue (HUE). In this embodiment, transparency is adjusted by the color correction mask (FIG. 3) and the gloss enhancement mask (FIG. 5) corresponding to the map data specifying the transparent region. Therefore, the imaging apparatus 1 creates a processed image that is a face image in which the gloss feeling of the lips has been improved, which is not sufficiently obtained by only the whitening process and the color correction process.

In addition, in the map data specifying the transparent region, for the saturation (S) and brightness (V) of a predetermined color value (HSV), a predetermined weight has been given to the transparency to adjust the transparency. In this embodiment, the transparency is adjusted by the color correction mask (FIG. 3) and the gloss enhancement mask (FIG. 5) corresponding to the map data specifying the transparent region. Therefore, the imaging apparatus 1 creates a processed image that is a face image in which the gloss feeling of the lips has been improved, which is not sufficiently obtained by only the whitening process and the color correction process.

The imaging apparatus 1 specifies a lip region as the predetermined region, using the HUE map for color correction (FIG. 3), the HUE map for gloss enhancement (FIG. 5), and the map. Therefore, the imaging apparatus 1 creates a processed image that is a face image in which the gloss feeling of the lips has been improved.

Furthermore, the present invention is not limited to the embodiments described above, and modifications, improvements, and the like within a range where the object of the present invention can be attained, are included in the present invention.

In the above-described embodiment, the color of the lips affected by the whitening process is corrected to an appropriate color. However, the invention is not limited to this configuration. Correction may be performed for a specific lip region such that the color of the lips is changed. Specifically, different lipstick or rouge colors may be used, lipstick, rouge, or gloss may be applied to the lips to which, for example, lipstick, rouge, or gloss has not been applied for makeup, or the degree of complexion may be adjusted. In this case, saturation may be actively changed. In addition, value or hue may be changed.

In addition, in the above-described embodiment, a lip region may be specified first and the lip region specified as a skin mask region may be designated in a case in which the whitening process is performed for the entire face.

Furthermore, in the above-described embodiment, an example of the imaging apparatus 1 to which the invention is applied is a digital camera. However, the imaging apparatus 1 is not particularly limited. For example, the invention can be generally applied to electronic apparatuses with a whitening function. Specifically, for example, the invention can be applied to a notebook personal computer, a printer, television receiver, a video camera, a portable navigation device, a mobile phone, a smart phone, and a portable game machine.

The processing sequence described above can be executed by hardware, and can also be executed by software. In other words, the hardware configuration of FIG. 3 is merely illustrative examples, and the present invention is not particularly limited thereto. More specifically, the types of functional blocks employed to realize the above-described functions are not particularly limited to the examples shown in FIG. 3, so long as the mobile terminal 2 can be provided with the functions enabling the aforementioned processing sequence to be executed in its entirety. A single functional block may be constituted by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 113 of FIG. 2 distributed separately from the device main body for supplying the program to a user, but also can be constituted by a storage medium or the like supplied to the user in a state incorporated in the device main body in advance. The removable medium 113 is composed of, for example, a magnetic disk (including a floppy disk), an optical disk, a magnetic optical disk, or the Like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mind-Disk) or the like. The storage medium supplied to the user in a state incorporated in the device main body in advance is constituted by, for example, the ROM 12 of FIG. 2 in which the program is recorded, and a hard disk included in the storage unit 19 of FIG. 2, and the like.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus comprising:
   a storage; and
   a processor,
   wherein the processor is configured to:
      acquire a face image;
      store the acquired face image in the storage;
      create an adjusted face image by reading out the acquired face image from the storage, and increasing a brightness of a predetermined region of a face in the acquired face image read out from the storage; and
      synthesize the acquired face image with the adjusted face image, using map data in which the predetermined region of the face is set as a transparent region.

2. The image processing apparatus according to claim 1, wherein, in the map data, transparency for a pixel with a predetermined color value has been adjusted.

3. The image processing apparatus according to claim 2, wherein, in the map data, for saturation and brightness of the pixel having the predetermined color value, a predetermined weight value has been given to the transparency to adjust the transparency.

4. The image processing apparatus according to claim 1, wherein the predetermined region is a region including lips.

5. The image processing apparatus according to claim 1, wherein the processor is configured to synthesize the acquired face image, which has been acquired by the processor and whose brightness has not been adjusted, with the adjusted face image, using the map data.

6. An image processing method which is performed by an image processing apparatus, the image processing apparatus including a storage and a processor, and the image processing method comprising:
   acquiring a face image;
   storing the acquired face image in the storage;
   creating an adjusted face image by reading out the acquired face image from the storage, and increasing a brightness of a predetermined region of a face in the acquired face image read out from the storage; and
   synthesizing the acquired face image with the adjusted face image, using map data in which the predetermined region of the face is set as a transparent region.

7. The image processing method according to claim 6, wherein, in the map data, transparency for a pixel with a predetermined color value has been adjusted.

8. The image processing method according to claim 7, wherein, in the map data, for saturation and brightness of the pixel having the predetermined color value, a predetermined weight value has been given to the transparency to adjust the transparency.

9. The image processing method according to claim 6, wherein the predetermined region is a region including lips.

10. The image processing method according to claim 6, wherein the synthesizing comprises synthesizing the acquired face image, which has been acquired in the acquiring and whose brightness has not been adjusted, with the adjusted face image, using the map data.

11. A non-transitory computer-readable storage medium storing an image processing program for an image processing apparatus including a processor and a storage, the image processing program being executable by the processor to control the processor to perform processes comprising:
   acquiring a face image;
   storing the acquired face image in the storage;
   creating an adjusted face image by reading out the acquired face image from the storage, and increasing a brightness of a predetermined region of a face in the acquired face image read out from the storage; and
   synthesizing the acquired face image with the adjusted face image, using map data in which the predetermined region of the face is set as a transparent region.

12. The storage medium according to claim 11, wherein, in the map data, transparency for a pixel with a predetermined color value has been adjusted.

13. The storage medium according to claim 12, wherein, in the map data, for saturation and brightness of the pixel having the predetermined color value, a predetermined weight value has been given to the transparency to adjust the transparency.

14. The storage medium according to claim 11, wherein the predetermined region is a region including lips.

15. The storage medium according to claim 11, wherein the synthesizing comprises synthesizing the acquired face image, which has been acquired in the acquiring and whose brightness has not been adjusted, with the adjusted face image, using the map data.

* * * * *